Nov. 17, 1970  J. L. JOHNSTON ET AL  3,540,213
HYDRAULIC ACTUATOR AND METHOD
Filed Sept. 19, 1968  2 Sheets-Sheet 1
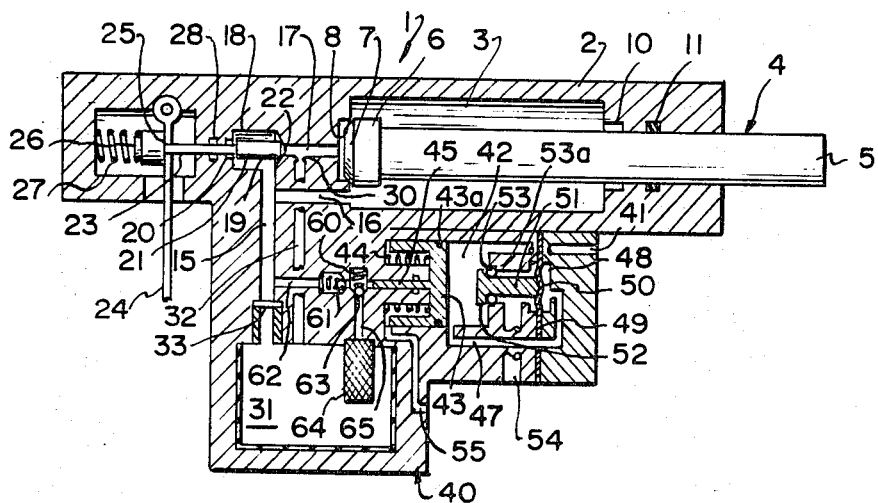
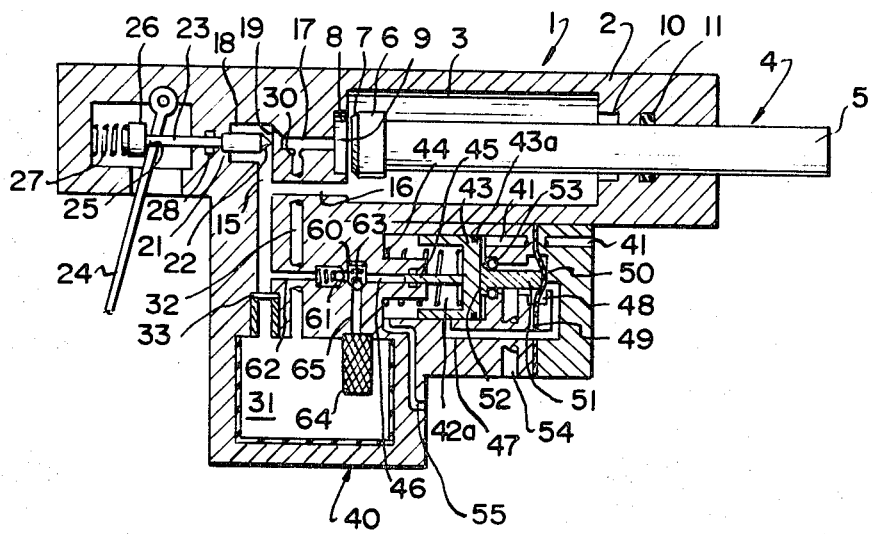
INVENTORS
JOSEPH L. JOHNSTON, DECEASED
BY ANNABELLE JOHNSTON
EXECUTRIX OF HIS ESTATE &
WAYNE E. HUNNICUTT.
BY Petherbridge, O'Neill, & Aubel
ATTORNEYS.

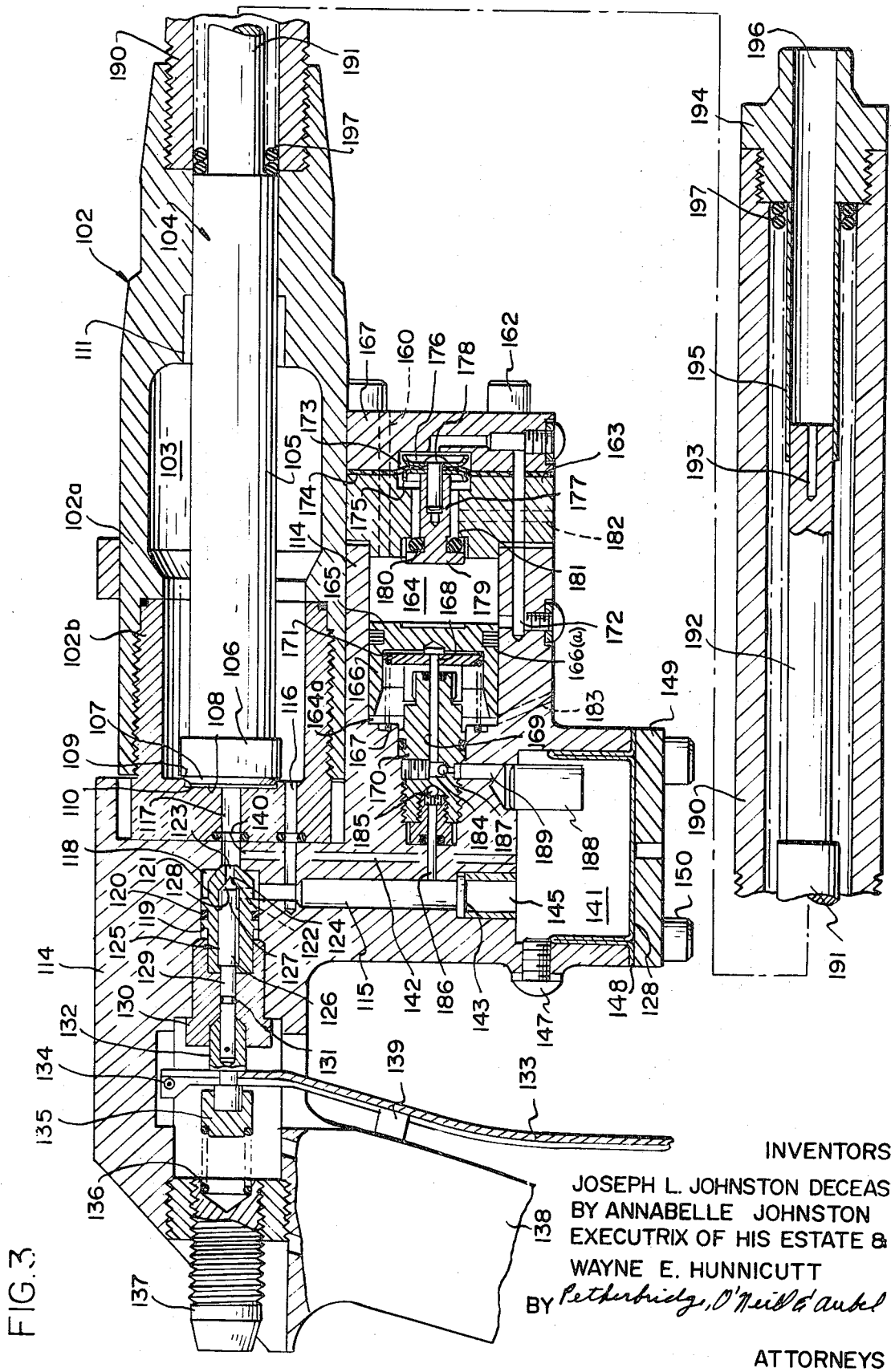

United States Patent Office 3,540,213
Patented Nov. 17, 1970

3,540,213
HYDRAULIC ACTUATOR AND METHOD
Joseph L. Johnston, deceased, late of Chenequa, Wis., by Annabelle Johnston, executrix, Chenequa, Wis., and Wayne E. Hunnicutt, Big Bend, Wis.; said Hunnicutt assignor to Applied Power Industries, Inc., Milwaukee, Wis., a corporation of Wisconsin
Filed Sept. 19, 1968, Ser. No. 764,020
Int. Cl. F15b *15/17*
U.S. Cl. 60—1                14 Claims

ABSTRACT OF THE DISCLOSURE

A hydraulic actuator and method for producing the propulsion of a prime mover which embody the development of potentially explosive fluid forces in a confined area and the release of such forces to react upon and propel the prime mover with substantial velocity. Both the actuator apparatus and method are designed to utilize fluid at high pressure compressed and confined in a chamber containing a portion of the prime mover in a static condition. The fluid compression in the chamber is released by a triggering device in a manner producing a high speed reaction of the prime mover. In a specific embodiment of the actuator and method, such as a stud driver, a light-weight, quick cycling device can be produced which utilizes a relatively low pressure fluid motor to pump and compress fluid in a chamber containing a stud driving piston. A fluid pressure triggering device, designed to overcome the problems of high pressure reaction forces is utilized to allow the fluid in the chamber to expand rapidly and propel the piston and a stud carried thereby at a relatively high velocity. Predetermined piston over-travel can be produced as well as the hydraulic cushioning of the piston near the end of its stroke.

In developing the method and apparatus of the invention, the rapid and efficient release of the energy of a compressed fluid to propel a piston or prime mover gave rise to a number of troublesome problems. The devices used to release or trigger the compressed fluid to initiate piston propulsion were damaged and in some cases destroyed by the reaction forces of the expanding fluid. In such instances, the release device would be rendered inoperable by the reaction forces and the efficiency of piston output was diminished. This was overcome by the development of a release or trigger mechanism of the invention. The new triggering mechanism utilized a hydraulic cushion to protect the mechanical parts of the triggering system from the hydraulic reaction forces and to minimize response to such forces to enhance the efficiency of the system.

In recent years, there has been substantial activity in the field of "High Energy Rate Forming" of metals. Equipment which is currently available for such forming is large, expensive and designed for very high energy levels. The equipment ordinarily consists of an electric-hydraulic-pneumatic pressure-creating section, a triggering mechanism, pressure responsive rams which do the work, and a frame to tie the elements together.

The high velocities and high levels of energy which can be created in high energy rate forming can be used in fields other than metalforming. Until the development of the subject invention, work done using hydraulics has been primarily a function of oil flow and oil pressure. Because of this, when hydraulics were applied to linear actuators, the result was a relatively low velocity movement of the actuator. Now with the present invention, it is possible to realize very high velocities from linear actuators.

In the hydraulics field, the concept of compressing a hydraulic fluid, such as oil, to store energy is not new. For example, this principle has been used in the design of hydraulic springs to store energy for very short periods of time. However, until the development of the invention, it has not been possible to use this principle to store the energy as potential energy for any length of time, and then to release it in such a manner that it rapidly and efficiently converts into kinetic energy.

A stud driving device embodying the principles of the invention has been developed which embodies a single relatively light-weight package containing an air motor, a hydraulic pump, and the complete hydraulic circuitry to store energy and to substantially instantly and efficiently release the stored energy.

The air motor of the stud driving device is a single-acting motor although a double acting motor could be employed. It utilizes a diaphragm valve to control the air flow through the motor and a piston to apply pressure to the fluid in the actuator chamber. As the piston moves in one direction, it opens a passage provided in the motor housing to divert air pressure to the diaphragm valve which in turn opens a pressure relieving exhaust port. This reduces the pressure on the piston and allows it to resiliently respond to return springs. As the piston responds to pressure reduction, it opens a passage which bleeds air pressure from behind the diaphragm valve and then mechanically closes the air exhaust port. This allows pressure to build up an drives the piston on a power stroke. Rapid piston-diaphragm valve cycling continues until the air supply is finally shut off or the forces on the delivery side of the piston equal the forces on the air side and the pump stalls.

The hydraulic pump utilized in conjunction with the air motor or pump of a stud driver of the invention is a ballcheck pump, which embodies the piston of the air pump, an inlet check ball and an outlet check ball. When operating in the high pressure ranges and capabilities of the stud driving device, e.g., 30–35,000 p.s.i. pump clearance volume becomes very critical due to the compressibility of the hydraulic oil employed. The pump clearance volume can be made so large that there is virtually no output because the hydraulic oil is compressing and expanding within the clearance volume of the pump and is not being delivered under pressure to the actuator chamber. At extreme operating pressures, critical factors which can contribute to a drop in efficiency through a loss of actual pressure ratio are packing friction, return springs, etc. The pump of the stud driver of the invention is a high pressure, low volume pump with a repersentative oil displacement of only .00187 in.$^3$ per cycle. A representative piston might be only .069 inch in diameter. Tests under operating conditions have indicated that in order to get an actual 300:1 air to oil pressure ratio, it is necessary to have a theoretical pressure ratio of about 400:1.

The trigger mechanism for actuating the stud driver basically consists of a manually operable trigger lever (in certain applications a hydraulic or pneumatically operated lever could be used), valve, pressure relief restrictor, and a power piston valve. Both the trigger valve and power piston valve are normally maintained in a hydraulically unbalanced condition to keep them closed. The pressure relief restrictor allows possible leakage to return to a reservoir, yet is small enough to allow a rapid build-up of triggering pressure between the trigger valve and the power piston valve. A hydraulic cushion or stop for the trigger valve prevents damage to the trigger mechanism when the valve is suddenly exposed to high actuator chamber pressure. The trigger valve is also spring biased to a normally closed position.

An integral part of the stud driver device is the self-contained hydraulic oil reservoir which is provided with a rubber bladder to permit the unit to have a closed and substantially hermetically sealed hydraulic circuit. This is a very desirable feature at higher operating pressures to minimize the entry of air into the system.

The high pressure hydraulic circuitry of the stud driver or system is generally provided with a safety blow-out disc, which acts as a safety valve for the circuit. If the hydraulic system is subjected to a predetermined level of extreme pressure, the disc will rupture and bleed the pressure in the circuit to the reservoir which is maintained at substantially atmospheric pressure.

The power or actuator chamber of the stud driver acts as a hydraulic pressure accumulator and is capable of containing pressures in excess of 30,000 p.s.i. The bulk of the hydraulic oil is compressed at a predetermined pressure and is stored at this pressure in this area as potential energy.

The actuator power piston performs the actual work of the stud driver. It functions as a linear actuator or hammer, as the case may be. The driven end of this piston is positioned within the power chamber to maximize the efficiency of converting the potential energy of the compressed hydraulic oil to kinetic energy in propelling or driving the piston.

In carrying out the method of the invention utilizing a device such as a stud driver, air pressure is supplied to the air motor which in turn drives the oil pump. Oil from the bladder line reservoir is drawn into the pump through an inlet filter and inlet check valve. The hydraulic oil is discharged through the outlet check valve into a passage which feeds the oil both to the trigger valve and the power or actuator chamber. Unbalanced pressure exposed surface areas in the valves keep them closed as pressure is built up in the actuator chamber.

The stored potential energy of the compressed oil is essentially explosively released when the trigger lever is actuated, pulling the trigger valve off of its seat. This allows the high pressure oil to act on the side of the power piston valve communicating with the end of the actuator piston unexposed to actuator chamber pressure. The pressure relief restrictor of the hydraulic system is ordinarily sized so that a high pressure is maintained on the unexposed side of the power piston valve long enough to lift it off its seat. When this occurs, the areas are arranged to unseat the actuator piston through an unbalance of surface areas. As soon as the piston leaves its seat, the unbalanced area is exposed to the virtual explosive expansion of the compressed oil. (For example, if the area is 0.4 in.$^2$ and the pressure is 30,000 p.s.i., there is a force of 12,000 lb. acting on the piston at the beginning of travel.) The duration of time and actual energy imparted to the piston will depend upon the pressure of the oil and the quantity which has been compressed. This triggering and releasing method provides a very efficient way of converting the potential energy in the oil to kinetic energy in the piston.

The piston head is protected at the end of its stroke by a hydraulic cushion to prevent its being damaged. The recess providing the hydraulic cushion is also formed at a predetermined depth to provide piston over travel to compensate for recoil of the unit in operation.

Although the size of stud driver made in accordance with the invention is small to provide for easy handling, it can build up any pressure from 0–35,000 p.s.i. It is very versatile since it can store instantly-releasable energy which can be varied in magnitude by:

(1) Varying the fluid pressure.
(2) Varying the volume of fluid being compressed.
(3) Varying the unbalanced area of the driving piston.
(4) Varying the mass of the driving piston.
(5) Varying the reaction mass.

Because of its ability to instantly release the stored energy, it is posible to develop high horsepowers. However, it can expend this power for only short periods of time, such as the milli-second range.

Various other objects and advantages of the invention will become more fully apparent from the following description and drawings illustrating presently preferred embodiments thereof and wherein:

FIG. 1 is a schematic side elevation of a hydraulic actuator of the invention illustrating the actuator in a stored energy condition;

FIG. 2 is a schematic side elevation of the hydraulic actuator shown in FIG. 1 illustrating the actuator in a stored energy release condition; and FIG. 3 is a side elevation, with most parts broken away, illustrating a presently preferred hydraulic actuator embodiment designed primarily for use in driving studs.

Referring now to the hydraulic actuator schematically illustrated in FIGS. 1 and 2, the actuator apparatus is generally designated 1. The actuator apparatus includes a body 2. The body is formed with a hydraulic pressure accumulator chamber 3 which is preferably capable of safely containing hydraulically developed fluid pressures in excess of 30,000 p.s.i.

A piston generally designated 4 is disposed for reciprocable sliding movement with respect to the longitudinal axis of the accumulator or power chamber 3 and the apparatus body 2. The piston 4 consists of an axially elongated stem element 5 and an enlarged head element 6 located at the innermost end of the piston 4 positioned in the accumulator chamber 3.

As can be seen in both FIGS. 1 and 2, the enlarged head element 6 of the piston is inwardly tapered at its extremity and serves as a piston valve element 7 with a relatively broad and flat reaction surface. The tapered surfaces of the extremity of enlarged head element 6 are designed to cooperate with an annular seating edge 8 which forms the peripheral border of a recessed chamber 9 provided at the inner end of the hydraulic pressure accumulator chamber 3. Therefore, as shown in FIG. 1, when the piston valve element 7 at the distal end of head element 6 of the piston 4 is brought into engagement with annular seating edge 8, a generally annular sealing line contact is formed between the piston valve element 7 and the annular seating edge 8 which serves to separate the hydraulic pressure developed in the accumulator 3 from pressure developed in the recessed chamber 9.

The end of the accumulator chamber 3 opposite recessed chamber 9 is provided with a generally circular recess 10, which is of a diameter sufficient to accommodate the head element 6 of the piston 4 when the piston reaches the extreme end of a power stroke. This serves both as a hydraulic cushion for piston head element 6 and as a recoil compensation means providing a predetermined degree of piston over-travel in response to recoil provided by the unloading of the apparatus. Annular hydraulic pressure packings 11 are position adjacent recess 10 and are designed to prevent pressure leaks as the piston 4 moves reciprocably with respect to the body 2 of the actuator apparatus.

A triggering system is located behind the accumulator chamber 3 and the recessed chamber 9. Triggering pressure is transmitted through a pressure delivery conduit 15 from a pump mechanism which will be discussed subsequently. The hydraulic pressure delivery conduit 15 is used both to develop the compression of hydraulic fluid, and preferably a liquid, within the hydraulic pressure accumulator chamber 3 through connecting conduit 16 and to develop a hydraulic balance upsetting triggering pressure in recessed chamber 9 through connecting conduit 17.

As is shown in FIGS. 1 and 2, the hydraulic pressure delivery conduit 15 extends upwardly and into an enlarged trigger valve chamber 18. This chamber is generally circular in cross section and, as shown in the drawings, in chamber 42. The end 52 of the pilot valve member, which carries a sealing gasket 53 becomes unseated from seat 53a with the leftward movement of the pilot valve member. This acts to open chamber 42 to air exhaust passage 54 whereby the pressure in chamber 42 can be bled to the atmosphere. With the development of atmospheric pressure in chamber 42, the cylindrical piston member 43 is biased to the right by the action of spring 44. As the cylindrical piston member 43 moves to the right, secondary piston 45 is also moved to the right in passage 46 and air passage 47 becomes closed to chamber 42 and opened to chamber 42a after seal 43a passes over passage 47. Pressure in chamber 42 during the movement to the right of piston member 43 is maintained substantially at atmospheric due to its continued communication with air exhaust passage 54. Ultimately, however, piston member 43 engages the end 52 of pilot valve member 51 and biases it and gasket 53 into sealing engagement with seat 53a. At this stage, air pressure being introduced into the air motor through passage 41 is no longer bled through chamber 52 and out of air exhaust passage 54 since this passage is now in a closed condition. The pressure in chamber 42 again acts to drive piston member 43 to the left. As the piston 43 is driven to the left, air behind this piston in chamber 42a is vented to the atmosphere by a vent passage 55.

The operation of the low pressure air motor of the invention is extremely rapid and serves in cooperation with the fluid pump to quickly develop the required pressure in the accumulator chamber 3 of the actuator apparatus 1. This is accomplished primarily through a substantial area reduction, preferably in the neighborhood of 300 to 400 between the reaction area of the surface of cylindrical piston member 43 exposed to 100 p.s.i. air pressure in chamber 42 and the reaction area area of the secondary piston 45 being moved by the 100 p.s.i. air pressure.

Movement of the cylindrical piston member 43 and the coaxially disposed secondary piston 45 carried thereby, as is shown in FIG. 1, produces a compression stroke which forces hydraulic fluid contained in pump chamber 60 and connected in communication with passage 46 to be driven past ball check valve 61 and through pump passage 62 which opens into delivery conduit 15. As piston member 43 and secondary piston 45 move to the right, a suction stroke, as shown in FIG. 2, is produced. This causes the spring-biased ball check valve 61 to be firmly seated and passage 62 to be closed off, and simultaneously lifts spring-biased ball check valve 63 from its seat in pump chamber 60 whereby the suction produced by the secondary piston 45 in passage 46, causes hydraulic fluid to be lifted from pump 31 through filter 64 and passage 65 into pump chamber 60. At the end of the suction stroke of the piston 45, the ball check valve 63 is seated in response to its normally downwardly directed spring bias within pump chamber 60 to seal passage 65 and prevent return of hydraulic fluid to the sump during the compression stroke which follows. It should be understood that the reciprocation of the secondary piston 45, acting as a pump, proceeds at a rapid rate and converts the relatively low operating pressure of the air motor to a high pressure, low volume condition which is designed to rapidly develop hydraulic fluid pressures in the accumulator chamber in the range between about 30,000 and 35,000 p.s.i. In such pressure ranges, a number of common hydraulic fluids can be compressed and thereby reduced in volume from between 10% to 16%.

In operation, therefore, relatively low pressure air of about 100 p.s.i. can be utilized by the air motor of the actuator apparatus. Through the action of this low pressure air upon the relatively substantial reaction surface area of the cylindrical piston member 43, the relatively small surface area of the secondary piston (in the neighborhood of a 400 to 300 to 1 area reduction) can produce a relatively high pressure, low volume pumped fluid response. By the rapid reciprocation of the pump, substantial pressures can be rapidly developed in the hydraulic pressure accumulator chamber 3. When this pressure reaches a predetermined level, ordinarily one at which the hydraulic fluid contained in the accumulator chamber 3 has been compressed to a predetermined level, in the case of liquid between 10% and 15%, the actuator apparatus is in condition for pressure release or unloading. This is accomplished by manual operation of the trigger lever 24 which serves to unseat the trigger valve member 21 and to establish high pressure communication between the reaction surface area of valve element 7 of piston 4 and recessed chamber 9. Due to the differential hydraulic reaction area of the piston head element 6 within recessed chamber 9 as compared to that exposed to high pressure in accumulator chamber 3, the piston is substantially instantaneously unseated from the annular seating edge 8 bordering recessed chamber 9. This serves to convert the hydraulic pressure within accumulator chamber 3 from a hydraulic force which tends to maintain the seating of the piston 4 with respect to recessed chamber 9 to hydraulic force wherein almost the entire reaction surface area of the piston valve element 7, at the distal end of head element 6 of the piston, is available for high velocity thrust to the right. Under these conditions, the linear actuator of the invention is capable of propelling the piston 4 at a very high velocity. Tests have been run with devices of the invention wherein velocities in the area of 350 feet per second at kinetic energy levels of 600 foot pounds have been developed. Effective high energy hydraulic actuators of the type described have been built at weights under 9 lbs. including air motor-pump mechanisms and hydraulic fluid, with such unit being capable of developing horsepower in excess of 150.

The actuator of the invention, therefore, in being able to realize the effects of the almost instantaneous expansion of highly compressed hydraulic fluids at extreme energy levels, can be designed for use and operation in applications requiring, or capable of utilizing, high velocity and high energy hydraulic actuators which are light enough in weight to be portable and can utilize low energy sources for the development of operating loads.

FIG. 3 illustrates an embodiment of the invention which is presently preferred in applications wherein devices such as studs are driven at extremely high velocities into a work piece, such as wood, concrete or metal. The high energy rates which can be achieved through the invention have therefore been utilized in a specific apparatus which is relatively light in weight when considered in view of its output capabilities (under 9 lbs.), is fast recycling, utilizes a readily available source of low pressure air to develop the required substantial hydraulic operating pressures and has a minimum of mechanical parts.

The hydraulic actuator or stud driver apparatus illustrated in FIG. 3 is generally designated 101. The stud driver includes a body portion generally designated 102. The body portion includes a first element 102a and a second element 102b threaded thereto which serve to enclose a hydraulic pressure accumulator or power chamber 103, preferably capable of safely containing hydraulically developed fluid pressures in the 30,000 to 35,000 p.s.i. range.

A piston, generally designated 104, is positioned for reciprocation with respect to the longitudinal axis of the accumulator chamber 103, as well as the longitudinal axis of the body portion 102 of the stud driver. The piston 104 consists of an axially elongated stem element 105 and an enlarged head element 106 located at the innermost end of the stem element of the piston in the accumulator chamber 103.

The enlarged head element 106 of the piston is inwardly tapered, as shown, and serves as a piston valve element 107 which includes a relatively broad and flat is formed with a conical end portion 19 located adjacent connecting conduit 17. The chamber portion opposite the conical end portion 19 is formed with a generally coaxially located cylindrical recess 20. A trigger-valve member 21 is positioned in the trigger chamber 18 for generally axial movement therein. The trigger valve member 21 has a conical front end 22 which is formed with a smaller conical angle than the conical end portion 19 of the trigger valve chamber 18 to provide an essentially sealing line contact between the trigger valve member 21 and the conical end 19 of the trigger chamber.

The trigger valve member 21 is reciprocably and generally coaxially mounted within trigger valve chamber 18 of the actuator apparatus and is reciprocated by a stem element 23 supported in coaxial relationship to the chamber 78 within a passage in body 2. This stem element 23 is connected to a trigger lever 24 in pivotal relationship therewith at 25. A bolster member 26 is connected to the distal end of stem element 23 adjacent the pivot point 25. The bolster member 26 is connected to a biasing spring 27 to maintain the trigger lever 24 in the normal position shown in FIG. 1. The trigger lever 24 projects downwardly through and out of the body 2 of the actuator apparatus to make it accessible for manual operation from the exterior of the apparatus housing. An annular hydraulic packing gasket 28 is positioned around stem element 23 adjacent cylindrical recess 20 to prevent hydraulic fluid leakage and pressure loss from trigger valve chamber 18.

Referring to FIG. 1, in particular, it can be seen that hydraulic fluid pressure delivered through delivery conduit 15 will be applied to trigger valve chamber 18, but since the trigger valve member 21 is seated in the conical end portion 19 of the chamber, a greater surface area is exposed to the pressure in chamber 18 at the end of the trigger valve member 21 opposite conical end 22 thereof and exerts a sealing force on conical end 22 in cooperation with that produced by spring 27. The fluid pressure being delivered through conduit 15 is therefore diverted into connecting conduit 16 and into the hydraulic pressure accumulator chamber 3 wherein a pressure on the order of about 30,000 p.s.i. can be rapidly developed to compress the hydraulic fluid contained therein. When a predetermined pressure has been developed in the accumulator chamber 3 and the desired degree of hydraulic fluid compression has been attained, an operator may proceed to manually bias the trigger lever 24 to the position shown in FIG. 2. The biasing of the trigger lever serves to move the stem element 23 and trigger valve member 21 connected thereto to the left, overcoming the pressure being exerted on the back surface of the trigger valve member 21. As the conical end 22 of the trigger valve member 21 breaks the line contact with the conical end portion 19 of the trigger valve chamber 18, the hydraulic fluid pressure developed in the accumulator chamber 3, connecting conduit 16, delivery conduit 15, and trigger valve chamber 18 is transmitted substantially instantly through connecting conduit 17 to recessed chamber 9. The forces in the system, at this instant, are substantially balanced with all elements being essentially at equilibrium. This balance, however, is maintained for a period of time measurable in milliseconds since a substantial differential reactive piston surface area in chamber 9 is exposed to the system pressure. Since a greater piston surface area is exposed to the hydraulic pressure in recessed chamber 9 than is exposed to the hydraulic pressure in accumulator chamber 3, the piston valve element 7 at the distal end of head element 6 of the piston is moved from seated pressure sealing engagement with annular seating edge 8 of the chamber. This results in the exposure of the entire reactive surface area of the enlarged piston head element 6 to the full and essentially explosive expansion force of the highly compressed fluid or liquid in the accumulator chamber 3. The high energy release by the expanding fluid is one which can almost be said to occur instantaneously. Of course, the type of hydraulic fluid, preferably a liquid, which is subjected to the pressure developed in the apparatus of the invention will be determinative of the extent of compression of and energy release of the fluid power source. However, the substantially instantaneous expansion or unloading of the compressed fluid in the hydraulic pressure accumulator chamber 3 forms the basis for propelling the piston 4 axially through the actuator chamber at an extreme velocity.

Since the actuator apparatus of the invention is designed to serve as a hand operated tool, and in a preferred embodiment as a hydraulically actuated stud driver, several safety features were developed. First, a pressure relief restrictor 30 disposed in communication at one end with connecting conduit 17 between recessed chamber 9 and trigger valve chamber 18 and connected at another end to a low pressure sump 31 through a passage 32. The opening of the pressure relief restrictor 30 is sufficiently large to compensate for any pressure leakage which might develop in the system between the trigger chamber 18 or the accumulator chamber 3 and the recessed chamber 9 by by-passing pressure leakage in sump 31, thereby preventing the accidental discharge of the piston by an unwanted pressure increase in recessed chamber 9. The opening of the pressure relief restrictor, however, is made small enough to prevent interference with the substantially instantaneous propulsion of the piston 4 by the high energy release of the expanding hydraulic fluid.

As a further protective measure, a safety blow-out disc 33 is provided across delivery conduit 15 adjacent the sump 31. The disc 33 is made of a material and at a thickness which is designed to rupture at a predetermined pressure level. This level is determined, in the apparatus of the subject invention, in relation to the maximum operating pressures at which the actuator apparatus 1 is designed to be used. Pressure developed in the apparatus of the invention in excess of this predetermined level will cause the disc to rupture and permit the pressure to be bled directly to the low pressure sump 31.

An added feature of the actuator apparatus of the invention is the provision of a light-weight air motor-pump mechanism which is connected to the body 2 of the apparatus 1. The air motor-pump combination can utilize a source of relatively low air pressure, i.e., about 100 p.s.i. to very quickly develop the 30,000 p.s.i. operating pressures required for the effective operation of the actuator.

As is shown in FIGS. 1 and 2, the air motor-pump housing is generally designated 40. Relatively low pressure air, in the neighborhood of 100 p.s.i., is introduced into the air motor-pump housing 40 through passage 41. As is shown in FIG. 1, the passage 41 extends into an air pressure chamber 42. The air pressure in chamber 42 acts on a generally cylindrical piston member 43 moving it to the left, overcoming the normal bias of spring 44 directed to the right. This also produces the movement towards the left of a coaxially disposed secondary piston 45 in a passage 46, best seen in FIG. 2. With the movement of the cylindrical piston member 43 to the left, in response to the air pressure in chamber 42, an air passage 47 is opened in communication with chamber 42 and permits substantially 100 p.s.i. air pressure to pass therethrough into a chamber 48 wherein the air pressure can act upon a flexible diaphragm 49, moving it to the left. As is shown in FIG. 1, an end 50 of a pilot valve member 51 is connected to the diaphragm. Therefore, as the diaphragm 49 moves to the left, the pilot valve member 51 is simultaneously moved to the left. This occurs since the surface area of the diaphragm 49 exposed to air pressure in the chamber 48 exceeds the surface area of the end 52 of the pilot valve member 51 disposed in communication with the air pressure hydraulic reaction surface 108. The tapered surfaces of the valve element 107 are designed to cooperate with a relatively sharp annular seating edge 109 forming the peripheral border of a recessed chamber 110 provided in element 102b of the body portion 102 at the inner end of the hydraulic pressure accumulator chamber 103. When the piston valve element 107 at the distal end of head element 106 of the piston is brought into engagement with the annular seating edge 109 bordering recessed chamber 110, a generally annular sealing line contact is formed between the element 107 and the edge 109. This seal acts to separate the hydraulic pressure developed in the accumulator chamber 103 from the reaction surface 108 of the piston and pressure present in the recessed chamber 110.

The end of the accumulator chamber 103 in element 102a and positioned opposite the recessed chamber 110 is provided with a generally cylindrical recess 111 which is disposed in coaxial alignment with respect to the stem and head elements 105 and 106, respectively, of the piston. The diameter of the cylindrical recess 111 is of a size sufficient to accommodate the head element 106 of the piston when the piston reaches the extreme end of a power stroke. Since the tolerance between the inner peripheral surface of recess 111 is made quite close to that of the outer peripheral surface of head element 106, the cylindrical recess 111 acts to hydraulically cushion the piston head element 106 as the piston reaches the end of a stroke. The hydraulic fluid within the cylindrical recess 111 can escape from the recess only at a rate permitted by the tolerances existing between the recess and head element surfaces. Therefore, by restricting the rate of fluid flow from recess 111, the fluid retained within the recess can serve to cushion the shock loads of the piston head at the end of a stroke.

Recess 111 in body element 102a provides an additional important function in acting as a recoil compensator by providing a predetermined degree of piston over-travel in response to the recoil which ordinarily results from the unloading of the relatively light-weight stud driver apparatus. The over-travel feature provides a means whereby the incomplete penetration of a stud into a working surface, resulting from apparatus recoil, can be prevented. By providing a recess and by controlling the clearance between the recess and piston head, sufficient over-travel can be produced to permit the piston to drive a stud completely into a working surface.

A hydraulic triggering mechanism is located behind the accumulator chamber 103 and the recessed chamber 110 in housing 114. In the stud driver illustrated in FIG. 3, triggering pressure is transmitted through a pressure delivery conduit 115 provided in housing 114 from an air motor-pump mechanism incorporated in the lower portion of housing 114 and which will be discussed subsequently. The delivery conduit 115 is used both to develop the compression of hydraulic fluid, preferably a liquid, within the hydraulic pressure accumulator chamber 103 through connecting conduit 116 and to develop a hydraulic triggering pressure or force in recessed chamber 110 through connecting conduit 117.

As can be seen in FIG. 3, the delivery conduit 115 extends upwardly through housing 114 into an enlarged trigger valve chamber 118. This chamber is generally cylindrical in cross section. An annular trigger valve guide member 119 is fit securely into valve chamber 118 with an annular hydraulic packing 120 serving to prevent hydraulic fluid pressure leakage from the chamber 118. The interior of the valve guide member is formed with an axially elongated chamber 121 which is connected in communication with delivery conduit 115 through a radial passage 122 and in communication with connecting conduit 117 by a second passage 123 coaxially disposed with respect to connecting conduit 117. The chamber 121 formed in the valve guide member 119 is generally circular in cross section, is located in generally coaxial relationship with passage 123, conduit 117, accumulator chamber 103, and is formed with a conical end portion 124 located adjacent the point where passage 123 establishes communication with connecting conduit 117.

A trigger valve member 125 is positioned in the chamber 121 on the interior of valve guide member 119. The trigger valve member 125 includes a generally cylindrically shaped body portion 126, a cylindrical segment of reduced diameter 127 projecting from the forward end of the body portion 126, and a conical end portion 128 projecting from the cylindrical segment 127. Each of the enumerated elements of the trigger member 125 are located in substantially coaxial relationship with respect to the longitudinal axis of the chamber 121. The conical end portion 128 of the trigger member 125 is formed with a smaller conical angle than the conical end portion 124 of chamber 121 to provide for the establishment of an essentially sealing line contact between the trigger member 125 and the conical end portion 124 of the chamber 121.

The trigger valve member 125 is mounted for reciprocation within chamber 121 of guide member 119 and is reciprocated through the action of a stem element 129 connected to the back end of the body portion 126 of the trigger valve member 125. The stem element 129 is supported within an annular back-up member 130 which is telescoped over and assembled to the back portion of valve guide member 119. The stem element 129 is provided with an annular gasket 131 which acts to maintain a hydraulic pressure seal with respect to chamber 121 of guide member 119 to prevent fluid or pressure leakage therefrom as the stem is reciprocated within back-up member 130.

As is shown in FIG. 3, the stem element 129 of the triggering mechanism is connected by means of a yoke member 132 to a trigger lever 133 which is pivotally assembled in the housing 114 at 134. A bolster member 135 is connected to the distal end of stem element 129 on the opposite side of trigger lever 133. The bolster member 135 is connected to a biasing spring 136 which is designed to maintain the trigger lever 133 in the normal inoperative position shown in FIG. 3. Adjustment screw 137 is connected to the end of the biasing spring 136 opposite bolster member 135 and is threaded into the end of housing 114 in a manner such that the tension of biasing spring 136 can be selectively adjusted. A pistol grip 138 is formed as a part of housing 114 to enhance the manual operability of the hydraulic stud driver. A retractable safety stop 139 is made to project from pistol grip 138 of the apparatus and into essentially unyielding contact with trigger lever 133 to prevent the accidental actuation of the trigger and the unloading of the stud driver. When the stud driver is to be placed in operation, the safety stop is manually retracted with respect to the trigger lever 133, and the stud driver is thereby made ready for operation.

It can be seen from FIG. 3, that the hydraulic fluid pressure transmitted through delivery conduit 115 is introduced through passage 122 into chamber 121 of the valve guide member 119. By producing a trigger valve member 125 and guide member chamber 121 with clearance tolerances between the respective peripheries thereof, hydraulic fluid pressure entering chamber 121 through passage 122 can flow past cylindrical segment 127 and body portion 126 of valve member 125 producing a pressure in relation to the surface area of the back of body portion 126 sufficient to assist in the maintenance of a normally closed valve condition.

While the trigger valve member 125 is maintained in sealed relationship with respect to passage 123 of the guide member 119, fluid pressure being transmitted through delivery conduit 115 is diverted into connecting conduit 116 and thereby into hydraulic pressure accumulator chamber 103. These hydraulic fluid compressive pressures are rapidly developed in the accumulator chamber 103 by the apparatus. When a predetermined degree of compression of hydraulic fluid has been reached in accumulator chamber 103, the operator of the stud driver may proceed to retract safety stop 139 and squeeze trigger lever 133 towards pistol grip 138 to produce the pivotal movement of the trigger lever around pivot point 134. Yoke 132, connected to stem element 129, retracts trigger valve member 125 from sealing engagement with respect to conical end portion 124 of chamber 121. At the instant the hydraulic seal is broken between the trigger valve member 125 and the guide member 119, the full force of the pressure developed in the system reacts upon the trigger valve member 125 to drive it to the left. Destructive impact of the trigger valve member 125 against the back wall of chamber 121 is prevented in part by maintaining the reaction surface areas of the front and back portions of the member 125 in as near a balanced condition as possible to minimize thrust in any direction due to reaction surface area differential. The prevention of damaging or destructive impact of the member 125, however, is prevented primarily by the hydraulic pressure leakage path provided by the leakage path produced between the member 125 and guide member 119 through loose machining tolerances. This pressure leakage around member 125 places the back portion of chamber 121 in a condition wherein the pressure behind the trigger member 125 is at a level of the pressure in the system. Recoil of the trigger member 125 upon opening of the valve is thereby effectively cushioned.

Also, essentially instantaneously, as the hydraulic seal is broken by retraction of trigger member 125, the hydraulic fluid pressure developed in the accumulator 103, connecting conduit 116, delivery conduit 115, and chamber 121 is transmitted through connecting conduit 117 to recessed chamber 110. At this moment, the pressures throughout the hydraulic system of the stud driver are at substantially equilibrium. However, due to the substantial surface area differential of the reaction surface 108 of piston 104 exposed to the pressure in recessed chamber 110, as compared to the relatively small opposing reaction surface area of head element 106 exposed to the pressure in the accumulator chamber 103, the piston head element 106 at the distal end of piston 104 is suddenly moved from seated pressure sealing engagement with annular seating edge 109 of recessed chamber 110. This results in the exposure of the entire reactive surface area of the enlarged piston head element 106 to the substantially instantaneous energy release produced by the full and essentially explosive expansion force of the highly compressed fluid or liquid in the accumulator chamber 103. This almost instantaneous expansion of compressed hydraulic fluid in the accumulator chamber forms the basis for the propulsion of the piston 104 through the actuator chamber at an extreme velocity.

As was the case with the hydraulic actuator apparatus discussed with respect to FIGS. 1 and 2, the stud driver 101 of the invention includes a pressure relief restrictor 140 which is located in communication at one end with connecting conduit 117 between recessed chamber 110 and passage 123. The opposite end of the pressure relief restrictor is connected to a low pressure sump 141 through a passage 142. The opening of the pressure relief restrictor 140 is made large enough to compensate for any pressure leakage which might develop in the system between the trigger chamber 121 and the recessed chamber 110 by by-passing any pressure leakage to the low pressure sump 141, thereby avoiding accidental discharge of the stud driver through pressure build-up. The opening of restrictor 140 is made small enough, however, to prevent any interference with the high velocity propulsion of piston 104 by the explosive energy release of the expanding hydraulic fluid in actuator chamber 103.

A safety blow-out mechanism or disc, generally designated 143, is provided between sump 141 and delivery conduit 115. The disc 143 of the rupture mechanism is made of a material which is designed to rupture at a predetermined pressure level. The rupture pressure of the disc is determined in relation to the maximum operating pressures at which the stud driver apparatus is designed to be employed. Pressure developed in the hydraulic system of the stud driver of the invention in excess of this predetermined maximum pressure will cause the disc to rupture and permit hydraulic fluid pressure to be bled directly to the low pressure sump 141 through a passage 145 below the disc 143 which serves to establish communication between delivery conduit 115 and sump 141 when disc 144 is ruptured.

The low pressure (essentially atmospheric) sump 141 is filled with hydraulic fluid by an opening produced by the removal of nut 147 from the lower portion of the housing 114. The sump chamber 141 is lined with a flexible sheet or bladder 148, preferably rubber, which is sealed between the bottom of housing 114 and a cover plate 149 secured thereto by bolts 150. The flexible sheet or bladder 148 serves to enhance the air-tight characteristics of the sump and to prevent air penetration into the hydraulic fluid.

The lower portion of the stud driver housing 114 contains the light-weight air motor-pump mechanism which serves to develop the hydraulic fluid pressures utilized in the operation of the stud driver of the invention. The air motor-pump combination as shown in FIG. 3 is designed to utilize low pressure air, i.e., about 100 p.s.i., to develop the 30,000 p.s.i. operating pressures of the stud driver.

Low pressure air is introduced into the air motor-pump mechanism through a passage 160 formed in cover plate 161 which, with the assistance of bolts 162 is secured to valve support member 163 and housing 114. Passage 160 extends through valve support member 163 and opens into an air pressure chamber 164. The air pressure in chamber 164 delivered through passage 160 acts on the generally cylindrical reaction surface 165 of a cylindrical piston 166 to move the piston 166 to the left. This leftward movement overcomes the normal bias of spring 167 which ordinarily urges piston 166 in the right hand direction. The left-hand movement of piston 166 simultaneously produces the movement towards the left of a coaxially disposed secondary piston 168 in a passage 169 formed axially in pump element 170. The secondary piston 168 is connected, as shown in FIG. 3, to piston 166 to move simultaneously with the piston. A thrust plate is provided between piston 166 and spring 167 as shown in FIG. 3.

With the movement of the piston 166 to the left, in response to an air pressure build-up in chamber 164, an air passage 172 is opened to communication with chamber 164 and permits the low pressure air to pass therethrough into a chamber 173 wherein the air pressure can act upon a flexible diaphragm 174 and the valve elements 175 and 176 carried thereby causing the flexible diaphragm 174 to move to the left. Since an end of valve stem 177 is connected to the diaphragm 174 and valve elements 175 and 176 by a screw 178, the valve stem 177 moves with and in the direction of the diaphragm 174. Valve head 179 and the pressure sealing gasket 180 carried thereby become unseated from valve seat 181 by the leftward movement of valve head 179 since the surface area of the diaphragm 174 exposed to air pressure in the chamber 173 exceeds the surface area of the valve head 179 in chamber 164 and the pressures in both chambers 173 and 164 are substantially equal. With the unseating of the valve head 179 and gasket 180 from seat 181 provided on valve support member 163, air pressure chamber 164 is opened to air exhaust passage 182 whereby the pressure in the chamber 164 can be bled to the atmosphere.

With the establishment of atmospheric pressure in chamber 164, piston 166 is enabled to respond to the bias of spring 167 which urges the piston to the right. As piston 166 moves in the right hand direction, secondary piston 168 is also moved in the right hand direction in passage 169, and air passage 172 becomes closed to chamber 164 and opened to chamber 164a after seal 166a passes over passage 172. Pressure in chamber 164 during the right hand movement of piston 166 is maintained at substantially atmospheric pressure due to the continued communication of the chamber with air exhaust passage 182. Ultimately, piston 166 engages the valve head 179 and biases it and the gasket 180 carried thereby against and in sealing engagement with valve seat 181. At this moment, air pressure which is being continuously introduced in the air motor through passage 160 is no longer exhausted from chamber 164 through exhaust passage 182 since this passage is closed by the seating of the valve head with respect to seat 181. Closure of the exhaust passage permits air pressure in chamber 164 to rapidly develop and to drive piston 166 to the left. As piston 166 is driven to the left, air behind the piston is vented to the atmosphere by a vent passage 183. As in the case of the air motor discussed in connection with FIGS. 1 and 2, the operation of the low pressure air motor of the stud driver of FIG. 3 is extremely rapid and promotes the quick recycling of the system. The utilization of a low pressure air motor to develop high pump pressures is accomplished similarly through a substantial area reduction between the reaction surfaces of piston 166 and secondary piston 168 from in the neighborhood of between 300 to 400 to 1.

Movement to the left of the piston 166, shown in the stud driver of FIG. 3, and the coaxially disposed secondary piston 168 connected thereto, produces a compression stroke which forces hydraulic fluid contained in pump chamber 184 and connected in communication with pump passage 169 to be driven past spring biased ball check valve 185, through pump passage 186 and into delivery conduit 115. As piston 166 and secondary piston 168 moves to the right, a suction stroke is produced. This suction stroke causes the ball check valve 185 to be firmly seated and simultaneously lifts spring biased ball check valve 187 from its seat in pump chamber 184 whereby the suction produced by the secondary piston 168 in passage 169, causes hydraulic fluid to be lifted from low pressure sump 141 through filter 188 and passage 189 into pump chamber 184. At the completion of the suction stroke, the ball check valve 187 is seated in response to its normally downwardly directed spring bias within pump chamber 184 to seal passage 189 and prevent return of hydraulic fluid to the sump during the compression stroke. As was the case with the low pressure air motor, the pump is designed to very rapidly develop operational hydraulic fluid pressures in the accumulator chamber 103 to provide a fast recycling stud driver.

A barrel 190 is threaded onto the body element 102a of the stud driver body 102, as shown in FIG. 3. The barrel is axially elongated and disposed in coaxial relationship with the longitudinal axis of the piston 104. The barrel contains a cylindrical segment 191 extending from piston stem 105 in coaxial relationship therewith but having a reduced diameter. A second and still further reduced cylindrical segment 192 projects axially from segment 191 within the confines of barrel 190. The outermost end of second cylindrical segment 192 is provided with a magnetic dowel 193 telescoped therein to facilitate the handling of magnetic studs (not shown).

A generally cylindrical, axially elongated stud adapter member 194 is threaded to the outermost end of barrel 190. A cylindrical portion 195 of the stud adapter member projects into the barrel 190 in coaxial relationship therewith and is telescoped over the distal end of second cylindrical segment 192 when piston 104 is in the position illustrated in FIG. 3. Magnetic dowel 193 serves to aid in retaining studs within portion 195 prior to triggering the stud driver. The outermost end of stud adapter member 194 is provided with a stud loading and ejecting opening 196. The adapter member 194 threaded to the end of barrel 190 can be replaced by another stud adapter member to accommodate studs of various sizes.

A compression spring 197 is telescoped over the first and second cylindrical segments 191 and 192 within barrel 190. The innermost end of the spring is biased against stem element 105 of the piston 104. The opposite end of spring 197 is biased against adapter member 194. Upon completion of the firing or unloading phase of the stud driver operation, spring 197 acts to automatically return the head and valve elements 106 and 107 of the piston 104 into engagement with seating edge 109 in preparation for reloading and recycling of the hydraulic system of the stud driver. A simple manual return of piston 104 can be used in place of the spring system as could a pneumatic or hydraulic return be used.

Various modes of carrying out the invention are contemplated as being within the scope of the following claims particularly pointing out and distinctly claiming the subject matter which is regarded as the invention.

What is claimed is:

1. A hydraulic actuator comprising a housing having walls defining a hydraulic power chamber; a piston disposed within the hydraulic power chamber, the piston being enlarged at an end thereof; means in the power chamber for seating the enlarged piston end in a manner shielding a portion of the enlarged end from communication with the hydraulic power chamber; a conduit formed in the housing extending from communication with the power chamber seating means into communication with the hydraulic power chamber; trigger means interposed in said conduit for selectively exposing the shielded portion of the enlarged piston end to fluid pressure, the trigger means including a member disposed across said conduit in sealing relationship to prevent pressure communication therethrough, means for selectively moving the member out of sealing relationship with respect to said conduit, and hydraulic cushion means disposed behind the member to reduce reaction shock thereupon; and means for pressurizing hydraulic fluid in the hydraulic power chamber.

2. The hydraulic actuator of claim 1 wherein the end of the piston opposite the enlarged end thereof is disposed for reciprocation within the housing and is sealed with respect to the housing to substantially prevent the escape of hydraulic fluid from the power chamber.

3. The hydraulic actuator of claim 2 wherein the wall of the hydraulic power chamber bordering the opening into which the piston projects is counter-bored to provide a recess for accommodating the enlarged end of the piston near the end of a piston stroke thereby providing a predetermined degree of piston over-travel through the power chamber and the hydraulic cushioning of the enlarged piston end near the completion of a piston stroke.

4. The hydraulic actuator of claim 1 wherein the hydraulic power chamber is provided with a hydraulic liquid under sufficient pressure to compress the liquid a predetermined amount.

5. A hydraulic actuator comprising a housing having walls defining a hydraulic power chamber; a piston disposed within the hydraulic power chamber, the piston being enlarged at an end thereof; means in the power chamber for seating the enlarged piston end in a manner shielding a portion of the enlarged end from communication with the hydraulic power chamber; passage means in the housing disposed in communication with the power chamber seating means and in communication with the hydraulic power chamber; trigger means interposed in the passage means for selectively exposing the shielded portion of the enlarged piston end to fluid pressure, the trigger means including a member disposed across and in sealing relationship with respect to the passage means comprising a valve body establishing fluid pressure communication therethrough, a valve stem disposed for sliding reciprocation within the valve body and seated adjacent an extremity of the valve body to effect sealing of the passage means to prevent pressure communication therethrough, the valve body being provided with a chamber located behind the valve when in seated relationship with the body, the valve body and valve stem being formed with a fluid pressure leakage path therebetween when the valve stem is disposed in seated relationship permitting fluid pressure to leak into the chamber behind the valve stem, and means for unseating the valve stem to permit the enlarged end of the piston to be exposed to fluid pressure developed in the hydraulic power chamber, whereby the reaction of the valve stem in response to the power chamber pressure exerted thereupon is cushioned by the chamber behind the valve stem.

6. The hydraulic actuator of claim 5 wherein manually operable biasing means are connected for actuation of the valve stem.

7. A hydraulic actuator comprising a housing having walls defining a hydraulic power chamber; a piston disposed within the hydraulic power chamber, the piston being enlarged at an end thereof; means in the power chamber for seating the enlarged piston end in a manner shielding a portion of the enlarged end from communication with the hydraulic power chamber; passage means in the housing disposed in communication with the power chamber seating means and in communication with the hydraulic power chamber; trigger means interposed in one of the passage means for selectively exposing the shielded portion of the enlarged piston end to fluid pressure in the hydraulic power chamber; sump means connected to the passage means for supplying hydraulic fluid to the power chamber; and pump means connected between the sump and the power chamber for delivering hydraulic fluid from the sump means to the hydraulic power chamber and for pressurizing the hydraulic fluid, the pump means including a pump piston actuator chamber, a pump piston disposed for reciprocation in the actuator chamber, the pump piston having an enlarged head and substantial surface area exposed to the actuator chamber and having a stem portion having a cross-sectional area substantially smaller than the enlarged head and substantially unexposed to the pump piston head driving pressure in the actuator chamber, the stem portion of the pump piston being slidably disposed in the housing and actuable to produce: the reciprocation of the stem portion of the pump piston in the housing, the withdrawal of fluid from the sump, the delivery of fluid to the hydraulic power chamber, and the pressurization of the delivered fluid; the pump further including means for actuating the pump piston.

8. The hydraulic actuator of claim 7 wherein the means for actuating the pump piston includes means for introducing fluid into the actuator chamber at a preselected pressure to bias the pump piston in one direction, means for periodically reducing the fluid pressure in the actuator chamber, and resilient biasing means to bias the pump piston in opposition to fluid in the actuator chamber and in response to a reduction of pressure in the actuator chamber.

9. The hydraulic actuator of claim 8 wherein a diaphragm actuated vent valve means is actuated in response to a preselected first positioning of the pump piston to vent the actuator chamber and to permit the resilient return of the pump piston and is actuated in response to a preselected second positioning of the pump piston to close the vent and permit pump piston biasing pressure build-up in the actuator chamber.

10. The hydraulic actuator of claim 7 wherein a first normally closed backflow preventing valve closing sump communication with the passage means is openable in response to pump piston suction and closable in response to pump piston compression to withdraw fluid from the sump and a second normally closed backflow preventing valve is disposed in the passage means to permit passage of fluid withdrawn from the sump toward the hydraulic power chamber.

11. The hydraulic actuator of claim 7 wherein the sump includes a hermetically sealed flexible bladder member.

12. The hydraulic actuator of claim 7 wherein the hydraulic power chamber contains fluid compressed under substantial pressure and the pump is operable by relatively low fluid pressure.

13. A hydraulic actuator comprising a housing having walls defining a hydraulic power chamber, a piston disposed for reciprocation within the hydraulic power chamber, the piston being enlarged at an end thereof, one of the walls defining the hydraulic power chamber being provided with means for seating the enlarged piston end in a manner shielding a portion of the enlarged end from communication with the hydraulic power chamber, the opposite end of the piston being slidably disposed within the housing and sealed with respect to the housing to substantially prevent the escape of hydraulic fluid from the power chamber, passage means in the housing disposed in communication with the means for seating the enlarged piston end and in communication with the hydraulic power chamber to permit exposure of the shielded portion of the enlarged piston end to the fluid pressure developed in the hydraulic power chamber, valve means interposed in the passage means for selectively exposing the shielded portion of the enlarged piston end to the fluid pressure in the power chamber, sump means connected to the passage means for supplying hydraulic fluid to the power chamber; and pump means connected to the passage means for delivering hydraulic fluid from the sump means to the hydraulic power chamber and for pressurizing the hydraulic fluid, the pump means including a pump piston actuator chamber, a pump piston disposed for reciprocation in the actuator chamber, the pump piston having an enlarged head and substantial surface area exposed to fluid pressure in the actuator chamber and having a stem portion having a cross-sectional area substantially smaller than the enlarged head and substantially unexposed to the pump piston head driving pressure in the actuator chamber, the stem portion of the pump piston being slidably disposed in the housing and in communication with the sump connection of the passage means whereby the reciprocation of the stem portion of the pump piston in the housing can produce the withdrawal of fluid from the sump, the delivery of fluid to the hydraulic power chamber, and the pressurization of the delivered fluid, the pump further including means for introducing fluid into the actuator chamber at a preselected pressure to bias the pump piston in one direction, means for periodically reducing the fluid pressure in the actuator chamber, and resilient biasing means to bias the pump piston in the opposite direction in response to a reduction of fluid pressure in the actuator chamber.

14. A method of producing hydraulic propulsion of a piston having an enlarged end positioned in a compressible fluid containing power chamber, the enlarged end having a larger surface area shielded from communication with the compressible fluid contained in the power chamber and an oppositely disposed surface of lesser area in communication with the compressible fluid to maintain the larger area shielded, comprising the steps of compressing a compressible fluid to a pressure sufficient for propelling said piston when applied to the larger surface area of the enlarged end, shielding said larger surface area of the enlarged end from said compressed fluid pressure, applying said compressible fluid pressure against the opposing lesser surface area of the enlarged end to maintain the larger area shielded from communication with the compressible fluid pressure, and selectively applying the compressed fluid pressure from the power chamber against said larger surface area of the enlarged end creating a driving force which removes said larger area from its shielded position to be acted on by the compressed fluid hydraulically propelling said piston.

References Cited

UNITED STATES PATENTS

| | | | |
|---|---|---|---|
| 2,588,164 | 3/1952 | Roberts et al. | 103—50 |
| 2,648,949 | 8/1953 | Taylor | 60—1 |
| 3,150,488 | 9/1964 | Hayey | 60—51 |
| 3,431,725 | 3/1969 | Chen | 60—1 |

EDGAR W. GEOGHEGAN, Primary Examiner

U.S. Cl. X.R.

60—51, 52; 91—417

UNITED STATES PATENT OFFICE
CERTIFICATE OF CORRECTION

Patent No. 3,540,213      Dated November 17, 1970

Inventor(s) Joseph L. Johnston, deceased, by Annabelle Johnston executrix , et al.

It is certified that error appears in the above-identified patent and that said Letters Patent are hereby corrected as shown below:

Column 2, line 53, "repersentative" should read -- representative --. Column 4, line 57, "position" should read -- positioned --. Column 7, line 33, "400 between" should read -- 400 to 1 between --; line 36, "area" should be deleted; line 52, "pump" should read -- sump --.

Signed and sealed this 25th day of July 1972.

(SEAL)
Attest:

EDWARD M. FLETCHER, JR.       ROBERT GOTTSCHALK
Attesting Officer      Commissioner of Patent